US010724477B2

(12) United States Patent
Hawksworth et al.

(10) Patent No.: US 10,724,477 B2
(45) Date of Patent: Jul. 28, 2020

(54) TERTIARY LOCK SYSTEM FOR A THRUST REVERSER

(71) Applicant: Goodrich Actuation Systems Limited, Solihull, West Midlands (GB)

(72) Inventors: Andrew Hawksworth, Moreton (GB); James Holding, Cannock (GB)

(73) Assignee: GOODRICH ACTUATION SYSTEMS LIMITED, Solihull, West Midlands (GB)

( * ) Notice: Subject to any disclaimer, the term of this patent is extended or adjusted under 35 U.S.C. 154(b) by 157 days.

(21) Appl. No.: 15/974,841

(22) Filed: May 9, 2018

(65) Prior Publication Data
US 2018/0334995 A1    Nov. 22, 2018

(30) Foreign Application Priority Data
May 19, 2017    (EP) .................................... 17275072

(51) Int. Cl.
*F02K 1/76*    (2006.01)
*F02K 1/70*    (2006.01)
*F16H 25/22*    (2006.01)

(52) U.S. Cl.
CPC ................ *F02K 1/766* (2013.01); *F02K 1/70* (2013.01); *F16H 25/2204* (2013.01)

(58) Field of Classification Search
CPC .......... F02K 1/566; F02K 1/605; F02K 1/625; F02K 1/70; F02K 1/72; F02K 1/766; E05B 2047/0017; E05B 47/026; E05B 2047/0016; E05B 2047/0023; F16H 25/22; F16H 25/2204
USPC ........................... 244/110 B; 74/89.23, 89.34
See application file for complete search history.

(56) References Cited

U.S. PATENT DOCUMENTS

| 6,079,755 | A  | 6/2000 | Chang |
| 7,359,777 | B2 | 4/2008 | Betters et al. |
| 7,983,809 | B2 | 7/2011 | Kell et al. |
| 8,423,009 | B2 | 4/2013 | Srinivasan et al. |
| 8,509,990 | B2 | 8/2013 | Bennett |
| 9,090,339 | B2 | 7/2015 | Arms et al. |
| 9,109,541 | B2 | 8/2015 | Channel |
| 9,555,710 | B2 | 1/2017 | Berenbaum et al. |

(Continued)

FOREIGN PATENT DOCUMENTS

WO    2016058718 A1    4/2016

OTHER PUBLICATIONS

Extended European Search Report for International Application No. 17275072.1 dated Nov. 16, 2017, 9 pages.

*Primary Examiner* — David H Bollinger
(74) *Attorney, Agent, or Firm* — Cantor Colburn LLP

(57) ABSTRACT

A lock system for a component of a thrust reverser actuation system ("TRAS"), comprising a lock member translatable between a locked position, in which the lock member prevents movement of the thrust reverser component to deploy the thrust reverser actuation system, and an unlocked position, in which the lock member allows movement of the thrust reverser component to deploy the thrust reverser actuation system. The actuator may further comprise a screw shaft and a nut translatable along the screw shaft and operatively connected to the lock member. Rotational movement of one of the screw shaft and the nut causes the nut to translate along the screw shaft and, in turn, the lock member to move between its locked position and its unlocked position.

15 Claims, 2 Drawing Sheets

(56) References Cited

U.S. PATENT DOCUMENTS

| | | | |
|---|---|---|---|
| 2008/0250771 A1* | 10/2008 | Jones | F16H 25/2015 |
| | | | 60/228 |
| 2010/0089191 A1* | 4/2010 | Marin Martinod | B64C 13/34 |
| | | | 74/89.39 |
| 2012/0143888 A1 | 6/2012 | Neelakantan et al. | |
| 2017/0226775 A1* | 8/2017 | Hermann | E05B 47/0012 |

* cited by examiner

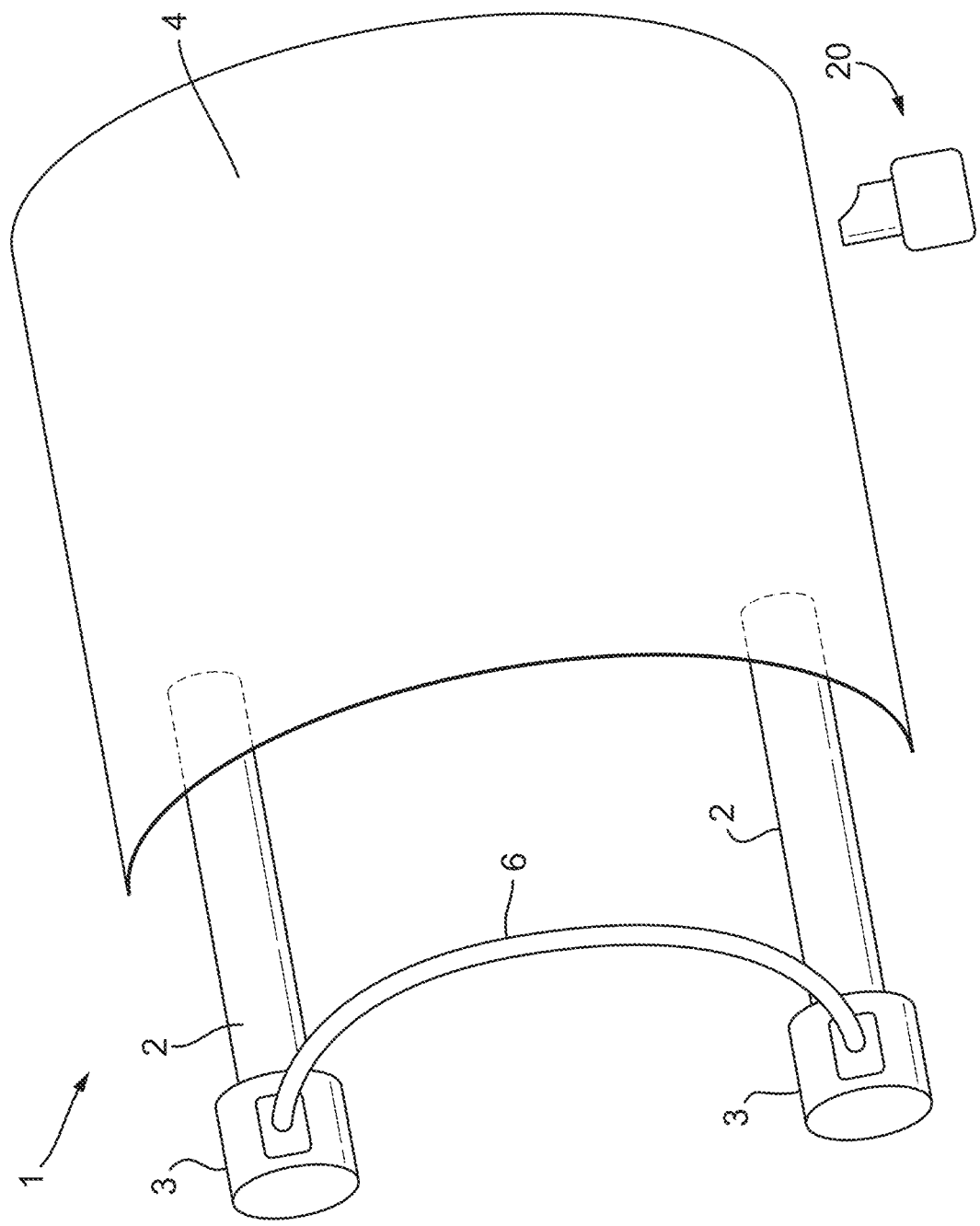

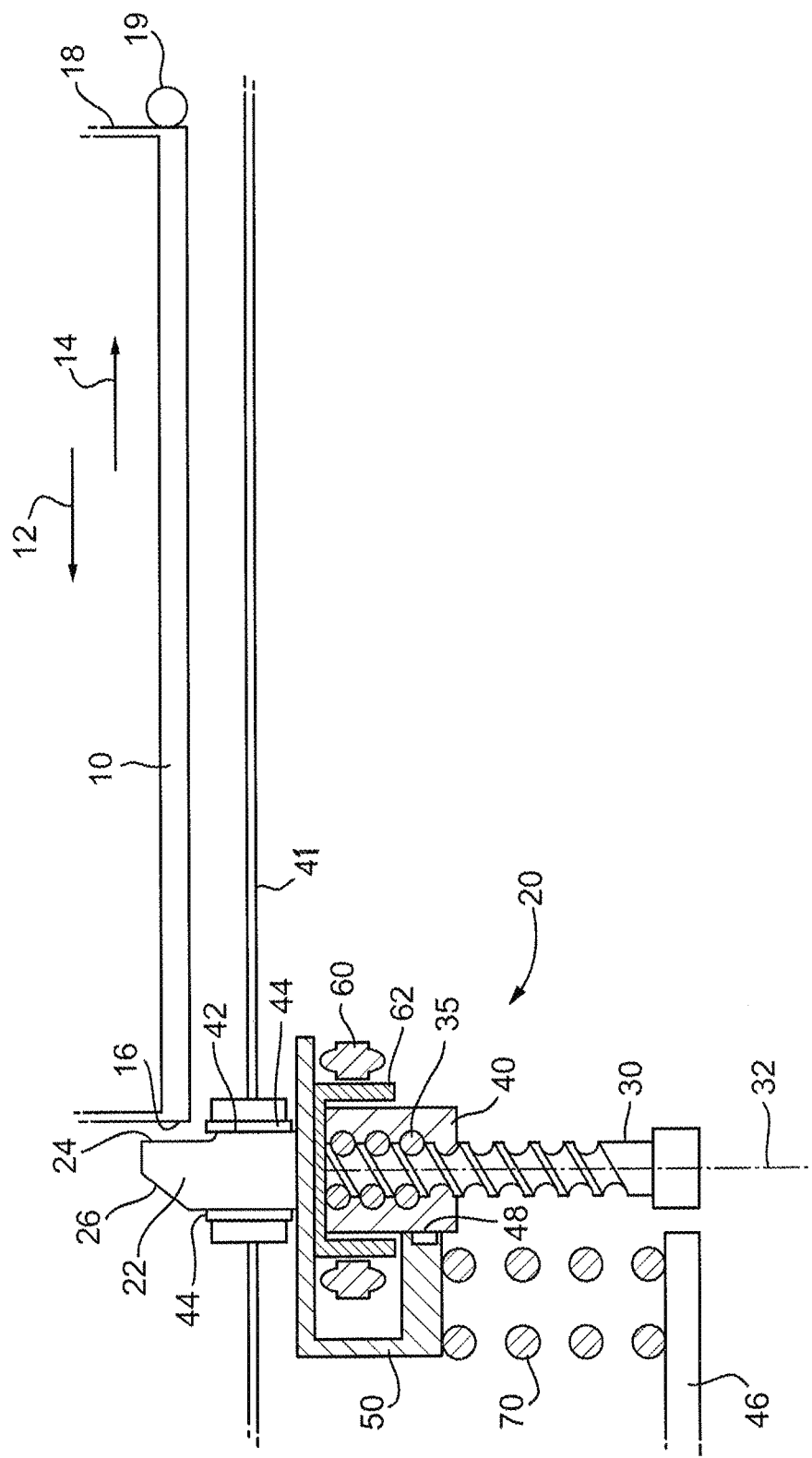

TERTIARY LOCK SYSTEM FOR A THRUST REVERSER

FOREIGN PRIORITY

This application claims priority to European Patent Application No. 17275072.1 filed May 19, 2017, the entire contents of which is incorporated herein by reference.

FIELD

The present disclosure relates generally to lock members and in particular to tertiary lock systems for thrust reverser components used in an aircraft (e.g., translating thrust reverser cowls).

BACKGROUND

Thrust reversers are provided on jet engines typically to increase the amount of braking on an aircraft upon landing. When deployed, a thrust reverser will change the direction of thrust of the jet engine such that some or all of the thrust is directed forwards, which acts to slow the aircraft so that it can then taxi off the runway.

There are a number of types of thrust reverser, all of which must be stowed during normal aircraft operation, for example so that the thrust reverser cannot be deployed during take-off or at a cruise altitude and can only be deployed during landing. In order to ensure this, one or more lock members are provided to prevent unwanted deployment of the thrust reverser, and in particular the actuators that move the various parts of the thrust reverser assembly.

Most thrust reverser systems include primary, secondary and tertiary locks. Although this may depend on the particular configuration, the primary locks are typically coupled to the actuators of thrust reverser, the secondary locks may be coupled to the power drive unit of the actuators and the tertiary locks may be coupled directly to a thrust reverser component (e.g., a translating cowl).

Conventionally, solenoid valves have been used to provide electrically operated tertiary locks used in thrust reversers. These are typically only capable of operating short translations and low loads, since in order to provide longer translations and/or higher loads the size of the solenoid exceeds the usual specification requirements for aerospace applications. Due to the short translation of the solenoid in such applications, most conventional arrangements require the use of multiple springs, and a pivoting member between a hook style locking member and the solenoid.

It is desired to provide an electrically operated tertiary lock system that is lightweight, compact and avoids the need to use a hook style locking member.

SUMMARY

In accordance with an aspect of the disclosure, there is provided a lock system (e.g., a tertiary lock system) for an aircraft thrust reverser, comprising: a non-rotating lock member translatable between a locked position, in which the lock member prevents deployment of the thrust reverser by blocking the path of a movable component, and an unlocked position, in which the lock member permits deployment of the thrust reverser by moving out of the path of the movable component; a screw shaft and a nut, wherein rotational movement of one of the screw shaft and the nut causes the other of the screw shaft and the nut to translate along the longitudinal axis of the screw shaft and, in turn, the lock member to move between its locked position and its unlocked position; and an electric motor configured to rotate the one of the screw shaft and the nut to cause the lock member to move between its locked position and its unlocked position.

The tertiary lock system may further comprise a resilient member configured to urge the lock member towards its locked position.

The resilient member may be a spring biased between the other of the screw shaft or nut, or a member attached to and movable with the other of the screw shaft or nut, and a fixed housing.

The lock member may be configured, in its locked position, to block the path of the movable component.

The movable component may form part of a translating cowl of the aircraft thrust reverser. The movable component may move with and/or be directly connected to the translating cowl. The movable component may be part of a beam of the translating cowl, such as a track beam.

The lock member may comprise a surface (e.g., a first surface) configured to abut the movable component upon movement of the movable component from a stowed position (and when the lock member is in its locked position), so as to prevent movement of the component to deploy the thrust reverser.

The plane formed by the first surface may be substantially perpendicular to the direction of travel of the movable component.

The lock member may comprise a second surface configured to abut the movable component upon movement of the movable component from a deployed position (and when the lock member is in its locked position). The second surface may be beveled such that, upon contacting the second surface, the movable component rides up the second surface and forces the lock member towards its unlocked position and out of the path of the movable component. The second surface may be on the opposite side of the lock member to the first surface.

The movable component may be configured to move completely past the lock member upon deployment of the thrust reverser, so that the lock member can move to its locked position when the movable component is in its deployed position. The provision of a beveled surface as described above means that the movable component can retract to its stowed position from its deployed position, even if power to the electric motor is cut or the lock member otherwise moves to its locked position.

The movable component may further comprise one or more rollers configured to contact the second surface upon movement of the movable component from its deployed position, wherein, in use, the roller(s) roll up the second surface and force the lock member towards its unlocked position (e.g., upon retraction of the thrust reverser), for example upon retraction of the thrust reverser.

The screw shaft may be non-rotating, and the motor may be configured to rotate the nut about the longitudinal axis of the screw shaft, in order to translate the screw shaft along its longitudinal axis and move the lock member between its locked position and unlocked position.

Alternatively, the nut may be non-rotating, and the motor may be configured to rotate the screw shaft about its longitudinal axis, in order to translate the nut along the longitudinal axis of the screw shaft and move the lock member between its locked position and unlocked position.

In accordance with an aspect of the disclosure, there is provided a thrust reverser assembly comprising the tertiary lock system as described above. The thrust reverser assembly may comprise the movable component, which may form part of a translating cowl of the thrust reverser assembly.

The thrust reverser assembly may further comprise one or more actuators configured to selectively move the movable component (and the translating cowl) between a stowed position and a deployed position, wherein the tertiary lock system may be configured to selectively prevent movement of the movable component (and the translating cowl) from its stowed position to its deployed position via selective movement of the lock member between its locked position and its unlocked position.

In its locked position, the lock member may prevent movement of the movable component (and the translating cowl) from its stowed position to its deployed position, and/or in its unlocked position the lock member may allow movement of the movable component (and the translating cowl) from its stowed position to its deployed position.

In accordance with an aspect of the disclosure, there is provided a method of preventing deployment of an aircraft thrust reverser, comprising: providing a tertiary lock system or thrust reverser assembly as described above; operating the electric motor to move the lock member from its unlocked position to its locked position, such that the lock member blocks the path of the movable component of the thrust reverser assembly and prevents deployment of the thrust reverser.

BRIEF DESCRIPTION OF THE DRAWINGS

Various embodiments will now be described, by way of example only, and with reference to the accompanying drawings in which:

FIG. 1 shows a thrust reverser assembly; and

FIG. 2 shows an embodiment of a tertiary lock system in accordance with the present disclosure.

DETAILED DESCRIPTION

FIG. 1 shows a thrust reverser assembly 1 of an engine (e.g., a jet engine) that comprises a thrust reverser actuation system ("TRAS") in the form of a plurality of actuators 2 that are configured to extend and retract a translating cowl 4. Although a single nacelle cowl is shown, typically two are provided per engine, and any number may be provided to suit a particular application. Similarly, the number of actuators may vary and the arrangement shown in FIG. 1 should be treated as representative of an example only.

One or more primary locks (not shown) may be included in the thrust reverser actuation system, and are typically located within the housing of the actuators 2. The primary locks may be configured to engage the components of the actuator 2 with which they are configured.

The thrust reverser assembly 1 may further comprise part of the nacelle structure of the engine, in this case the translating cowl 4. The thrust reverser assembly 1 may form part of a cascade-type thrust reverser, for example used on a high bypass ratio jet engine. In such an arrangement, the translating cowl 4 may be located on the external surface of the nacelle of the engine. When deployed (i.e., translated from a stowed position to a deployed position), the translating cowl 4 exposes a plurality of cascade vanes, which redirect airflow through the jet engine such that the direction of jet thrust is at least partially reversed.

A power drive unit 3 may be associated with each actuator 2, and may be configured to supply a drive force (e.g., a rotational drive force) to the actuator 2. The actuator 2 may be configured to receive the rotational drive force and, in response thereto, selectively move the translating cowl 4 between its stowed position and deployed position. The power drive units 3 may be operatively connected by a synchronisation mechanism 6, such that the actuators 2 may be driven at substantially the same time.

The lock systems of the present disclosure are directed to tertiary lock systems, which are configured to engage the moving parts of the nacelle structure of the engine. This is distinct from the primary and secondary lock systems, which typically engage the components of the actuators or power drive unit of the actuators, respectively.

A tertiary lock system 20 is shown schematically in FIG. 1 as engaging the translating cowl 4. It should be noted that the tertiary lock system 20 does not engage any component of the actuators 2. The tertiary lock system 20 may be fixed to the non-moving part of the nacelle structure, for example secured or mounted to a beam along which the translating cowl 4 moves (e.g., housing 41 as shown in FIG. 2).

FIG. 2 shows an embodiment of a tertiary lock system 20 in accordance with the disclosure, in which a thrust reverser component 10, which may be a translatable component that is configured to deploy a thrust reversing system. For example, the component 10 may expose, e.g., cascade vanes, causing some of the air flowing through the engine to be redirected in a forward direction to create a reverse thrust, which slows the aircraft to which the engine is attached upon landing. The component 10 may be operatively connected to the translating cowl 4 of the thrust reverser assembly 1 shown in FIG. 1.

The component 10 may be translatable in a first direction, as depicted by arrow 12, in order to deploy the thrust reverser. The component 10 may be translatable in a second opposite direction, as depicted by arrow 14, in order to stow the thrust reverser. A number of locking systems may be provided in order to prevent unwanted deployment of the thrust reverser. One such locking system 20 is shown in FIG. 2 and is configured to prevent movement of the component 10 in the first direction.

The lock system 20 comprises a lock member 22 that is translatable between a locked position, as shown in FIG. 1, and an unlocked position. The lock member 22 may translate in a direction perpendicular to the first and/or second directions.

The lock member 22 comprises a surface 24 configured to abut the component 10 and prevent its movement in the first direction (i.e., to prevent deployment of the thrust reverser). The surface 24 may be configured to abut a corresponding surface 16 on the component 10, and may be substantially perpendicular to the direction of travel (i.e., arrows 12 and 14) of the component 10.

It will be appreciated that the component 10 may be semi-cylindrical, and the corresponding surface 16 may be a semi-annular surface extending around its perimeter. Furthermore, a plurality of lock systems may be provided, each having the same configuration as the lock member 22 of lock system 20, such that a plurality of lock members engage the semi-annular surface at regularly spaced intervals around the perimeter of the component 10.

The lock member 22 may be movable within a passage 42 of housing 41, which housing 41 may be fixed, e.g., mounted on a beam within the engine case. One or more bearings 44 (e.g., sliding bearings) may be provided to allow the lock member 22 to move freely within the passage 42.

The lock system 20 is shown schematically and comprises a ballscrew arrangement including a screw shaft 30 that is fixed in position axially and is configured to rotate around the axis 32, causing the nut 40 to move axially along the screw shaft 30 (which is itself held against rotational movement). A plurality of ball bearings 35 travel inside the thread form of the screw shaft 30 and nut 40, and are recirculated continuously via a recirculation mechanism to allow the nut 40 to translate along the screw shaft 30 as aforesaid. Various ballscrew arrangements are known in the art and can be used in the present disclosure.

In alternative embodiments, the ballscrew arrangement may be replaced by a roller screw arrangement, which is similar to a ballscrew arrangement, but with rollers used to transfer load between the screw shaft 30 and nut 40, e.g., instead of ball bearings 35.

In the embodiment illustrated in FIG. 2, rotational movement of the screw shaft 30 causes the nut 40 to move or translate along the axis 32. A translating member 50 is operatively connected to the nut 40 such that translation of the nut 40 causes a corresponding translation of the member 50. A spline connection 48 (or other suitable connection) may be present between the nut 40 and member 50.

It will be appreciated that a number of bearings will be required between the various components shown schematically in FIG. 2, but are not shown specifically as they are not critical to the concepts described herein.

The member 50 is attached to the lock member 22, such that movement of the member 50 causes a corresponding movement of the lock member 22. In this manner, rotational movement of the screw shaft 30 causes a translational movement of the lock member 22 between its locked position and unlocked position.

The lock system 20 comprises a motor 60 configured to rotate the screw shaft 30 around its longitudinal axis 32 in order to move the nut 40 and, in turn, the member 50 and the lock member 22. The motor 60 may be configured to surround the screw shaft 30. A rotating member 62 may be located between the screw shaft 30 and the motor 60. The motor may be configured to rotate the rotating member 62 and, in turn, the screw shaft 30. The motor 60 may be fixed, e.g., in relation to the engine nacelle. Although not shown in FIG. 2, the member 50 and lock member 22 may comprise suitable apertures, such that they can move past the motor 60 and rotating member 62 in operation.

The lock system 20 may further comprise a locking spring 70 configured to urge the lock member 22 towards its locked position, as shown in FIG. 2. To do this, the locking spring 70 is located between a fixed housing 46, which may be mounted to the engine case, and the member 50. As the lock member 22 translates (i.e., out of the path of the component 10) to its unlocked position, the member 50 will move in the same direction and compress the locking spring 70, which resists such movement. The resistance of the locking spring 70 is overcome in use due to the force of the motor 60, which drives the member 50 in the direction of compression of the locking spring 70 to move the lock member 22 to its unlocked position.

In the event of a loss of electrical power to the motor 60, or if it is simply switched off, the locking spring 70 will urge the various components of the lock system 20 in the locking direction of the lock member 22 (with the exception of the screw shaft 30 which is fixed in position). This ensures a failsafe design in that if electrical power is lost, the lock spring 70 positions the lock member 22 in its locked position, ensuring that the lock system 20 is in a safe or locked condition. In such a condition, the thrust reverser will be prevented from being deployed from its stowed position, to prevent unwanted deployment (e.g., during take-off or at a cruise altitude).

In alternative embodiments, the nut 40 may be fixed axially and configured to rotate around the axis 32, which would cause the screw shaft 30 to move axially along its axis 32 (wherein the screw shaft 30 is held against rotational movement). In such embodiments, the screw shaft 30 would be operatively connected to the member 50, such that translation of the screw shaft 30 causes a corresponding translation of the member 50 and, in turn, the lock member 22.

As discussed above, when it is intended for the thrust reverser cowl to be deployed the electric motor 60 will rotate the screw shaft 30 (or, alternatively, nut 40), and the lock member 22 will translate out of the path of the component 10. The component 10 will then move in the direction of arrow 12 for deployment of the thrust reverser. Once deployed, the component 10 may move completely past the lock member 22. In the event of a loss of electrical power to the motor 60 in this situation, it is desired to provide features that allow the component 10 to retract to its stowed position.

Such features are shown in FIG. 2, and include a beveled surface 26 on the lock member 22 that is configured to abut the component 10 upon movement of the component 10 in the second direction of arrow 14. The beveled surface 26 may be configured to abut a corresponding surface 18 on the component 10, and may be at an angle (e.g., between 30-60 degrees) from the direction of travel (i.e., arrows 12 and 14) of the component 10.

As the component 10 moves in the second direction from its deployed position, it will contact the surface 26, forcing the lock member 22 to translate towards its unlocked position. One or more rollers 19 may be provided on the component 10 in order to reduce the friction between the lock member 22 and the component 10 in such a situation. The rollers 19 may be configured to contact the beveled surface 26 and roll up it, whilst pushing the lock member 22 towards its unlocked position.

The technology of the present disclosure allows an electrical motor to be used to translate a blade style lock member in a tertiary lock system for a thrust reverser. The use of a ballscrew or roller screw as described herein leads to a longer stroke and larger load for the lock member, meaning that the use of a hook style lock member can be avoided. It has been found that using a blade style lock member, with its increased load and stroke requirement, requires a large, heavy solenoid valve that would fall outside the requirement specifications of the nacelle.

Aspects of the invention extend to a thrust reverser assembly, for example the thrust reverser assembly 1 described above, which may be provided on a jet engine (e.g., a turbofan engine), for example to increase the amount of braking of an aircraft upon landing.

The thrust reverser assembly may comprise a movable component and a thrust reverser actuation system ("TRAS") comprising one or more actuators (e.g., actuators 2 shown in FIG. 1). The movable component may form part of a translating cowl of the thrust reverser, if the thrust reverser is, e.g., a "cascade-type" thrust reverser.

The actuators may be configured to selectively move the component between a stowed position and a deployed position. When the component is in its deployed position, the thrust reverser actuation system will change the direction of thrust of the jet engine such that some or all of the thrust is directed forwards, which acts to slow the aircraft so that it can then, e.g., taxi off the runway. When the component is in its stowed position, the thrust reverser actuation system will not change the direction of thrust of the jet engine, which operates normally.

The thrust reverser actuation system may be a cascade-type thrust reverser system, comprising one or more translating cowls and a plurality of cascade vanes. In such a system, the one or more translating cowls are each configured to move between a stowed position, in which the plurality of cascade vanes are not exposed to the jet thrust of the engine, and a deployed position, in which the plurality of cascade vanes are exposed to the jet thrust of the engine such that this is redirected in a generally or partially forward direction.

The thrust reverser actuation system may comprise one or more tertiary lock systems coupled to the movable component to prevent unwanted movement of the component (and, e.g., a translating cowl to which it may be attached) to its deployed position. The movable component may be a component 10 as described above in respect of FIG. 2, and the one or more tertiary lock systems may each have the features of the lock system 20.

The thrust reverser assembly may further include primary lock systems, for example that are coupled to the actuator, and secondary lock systems that are coupled to a power drive unit of the actuator. It will be appreciated that the tertiary lock system is distinct from the primary and secondary lock system, in that the tertiary lock system is configured to engage the moving component of the thrust reverser (e.g., a translating cowl that moves to expose a plurality of cascade vanes), rather than the actuator that moves the component, or the power drive unit of the actuator.

Although the present invention has been described with reference to preferred embodiments, it will be understood by those skilled in the art that various changes in form and detail may be made without departing from the scope of the invention as set forth in the accompanying claims.

The invention claimed is:

1. A tertiary lock system for an aircraft thrust reverser, comprising:
   a non-rotating lock member translatable between a locked position, in which the lock member prevents deployment of the thrust reverser by blocking the path of a movable component, and an unlocked position, in which the lock member permits deployment of the thrust reverser by moving out of the path of the movable component;
   a screw shaft and a nut, wherein rotational movement of one of the screw shaft and the nut causes the other of the screw shaft and the nut to translate along the longitudinal axis of the screw shaft and, in turn, the lock member to move between its locked position and its unlocked position; and
   an electric motor configured to rotate the one of the screw shaft and the nut to cause the lock member to move between its locked position and its unlocked position.

2. A tertiary lock system as claimed in claim 1, further comprising a resilient member configured to urge the lock member towards its locked position.

3. A tertiary lock system as claimed in claim 2, wherein the resilient member is a spring biased between the other of the screw shaft and the nut and a fixed housing, or between a member attached to and movable with the other of the screw shaft and the nut and a fixed housing.

4. A tertiary lock system as claimed in claim 1, wherein the lock member is configured, in its locked position, to block the path of the movable component.

5. A tertiary lock system as claimed in claim 1, wherein the movable component forms part of a translating cowl of the aircraft thrust reverser.

6. A tertiary lock system as claimed in claim 1, wherein the lock member comprises a first surface configured to abut the movable component upon movement of the movable component from a stowed position, so as to prevent movement of the component to deploy the thrust reverser.

7. A tertiary lock system as claimed in claim 6, wherein a plane formed by the first surface is substantially perpendicular to the direction of travel of the movable component.

8. A tertiary lock system as claimed in claim 1, wherein the lock member comprises a bevelled surface configured to abut the movable component upon movement of the movable component from a deployed position, such that, upon contacting the bevelled surface, the movable component rides up the bevelled surface and forces the lock member towards its unlocked position and out of the path of the movable component.

9. A tertiary lock system as claimed in claim 8, wherein the movable component comprises one or more rollers configured to contact the bevelled surface upon movement of the movable component from its deployed position, wherein, in use, the roller(s) roll up the bevelled surface and force the lock member towards its unlocked position.

10. A tertiary lock system as claimed in claim 1, wherein the screw shaft is non-rotating, and the motor is configured to rotate the nut about the longitudinal axis of the screw shaft, in order to translate the screw shaft along its longitudinal axis and move the lock member between its locked position and unlocked position.

11. A tertiary lock system as claimed in claim 1, wherein the nut is non-rotating, and the motor is configured to rotate the screw shaft about its longitudinal axis, in order to translate the nut along the longitudinal axis of the screw shaft and move the lock member between its locked position and unlocked position.

12. A thrust reverser assembly comprising the tertiary lock system as claimed in claim 1.

13. A thrust reverser assembly as claimed in claim 12, further comprising:
   the movable component:
   one or more actuators configured to selectively move the movable component between a stowed position and a deployed position;
   wherein the tertiary lock system is configured to selectively prevent movement of the movable component from its stowed position to its deployed position via selective movement of the lock member between its locked position and its unlocked position.

14. A thrust reverser actuation system as claimed in claim 13, wherein in its locked position the lock member prevents movement of the movable component from its stowed position to its deployed position, and in its unlocked position the lock member allows movement of the movable component from its stowed position to its deployed position.

15. A method of preventing deployment of an aircraft thrust reverser, comprising:
   providing a tertiary lock system as claimed in claim 1;
   operating the electric motor to move the lock member from its unlocked position to its locked position, such that the lock member blocks the path of the movable component of the thrust reverser assembly and prevents deployment of the thrust reverser.

* * * * *